(12) United States Patent
Croak et al.

(10) Patent No.: US 8,625,770 B1
(45) Date of Patent: Jan. 7, 2014

(54) METHOD AND APPARATUS FOR MONITORING A NETWORK ELEMENT

(75) Inventors: Marian Croak, Fair Haven, NJ (US);
Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1373 days.

(21) Appl. No.: 11/322,906

(22) Filed: Dec. 30, 2005

(51) Int. Cl.
*H04M 7/00* (2006.01)
(52) U.S. Cl.
USPC .............. 379/221.01; 379/133; 379/221.04; 379/221.07
(58) Field of Classification Search
USPC ......... 370/252, 401, 230, 468, 233, 235, 352; 379/219, 221.01, 221.04, 221.07, 133; 707/102
See application file for complete search history.

(56) References Cited

U.S. PATENT DOCUMENTS

| | | | | |
|---|---|---|---|---|
| 5,295,183 A * | 3/1994 | Langlois et al. | ......... | 379/112.04 |
| 6,570,855 B1 * | 5/2003 | Kung et al. | ................... | 370/237 |
| 6,625,119 B1 * | 9/2003 | Schuster et al. | ............. | 370/230 |
| 6,980,517 B1 * | 12/2005 | Qureshi et al. | ................ | 370/235 |
| 7,046,636 B1 * | 5/2006 | Shaffer et al. | ................ | 370/252 |
| 7,158,627 B1 * | 1/2007 | Lu | ............................ | 379/221.07 |
| 7,212,492 B1 * | 5/2007 | Au et al. | ....................... | 370/229 |
| 2005/0094623 A1 * | 5/2005 | D'Eletto | ....................... | 370/352 |
| 2006/0126529 A1 * | 6/2006 | Hardy | .......................... | 370/252 |

* cited by examiner

*Primary Examiner* — Simon Sing
*Assistant Examiner* — Simon King

(57) ABSTRACT

A method and apparatus for monitoring a network element in a communications network are described. In one example, an alarm message from the network element when a change in rate associated with at least one of a central processing unit (CPU) utilization or a memory usage by the network element exceeds a predefined threshold. An instruction is subsequently sent to the network element to reduce the change in rate associated with the at least one of the CPU utilization or the memory usage.

20 Claims, 4 Drawing Sheets

METHOD AND APPARATUS FOR MONITORING A NETWORK ELEMENT

BACKGROUND OF THE INVENTION

1. Field of the Invention

Embodiments of the present invention generally relate to telecommunications systems and, more particularly, to a method and apparatus for monitoring a network element in a communications network, such as a packet network, e.g., a voice over internet protocol (VoIP) network.

2. Description of the Related Art

Generally, telecommunications systems provide the ability for two or more people or machines (e.g., computerized or other electronic devices) to communicate with each other. A telecommunications system may include various networks for facilitating communication that may be generally organized into packet networks and circuit-switched networks. An exemplary circuit-switched network includes a plain old telephone system (POTS), such as the publicly switched telephone network (PSTN). Exemplary packet networks include internet protocol (IP) networks, asynchronous transfer mode (ATM) networks, frame-relay networks, and the like. One type of packet network is a voice-over-internet protocol (VoIP) network.

In order for a network (e.g., VoIP network) infrastructure to operate at a high performance level, it is critical to understand how each component is operating. Network operators that respond in a proactive way to potential problems can prevent service disruptions that might otherwise occur.

Thus there is a need in the art for a method and apparatus for monitoring a network element.

SUMMARY OF THE INVENTION

In one embodiment, a method and apparatus for monitoring a network element in a communications network are described. Specifically, an alarm message from the network element when a change in rate associated with at least one of a central processing unit (CPU) utilization or a memory usage by the network element exceeds a predefined threshold. An instruction is subsequently sent to the network element to reduce the change in rate associated with the at least one of the CPU utilization or the memory usage.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
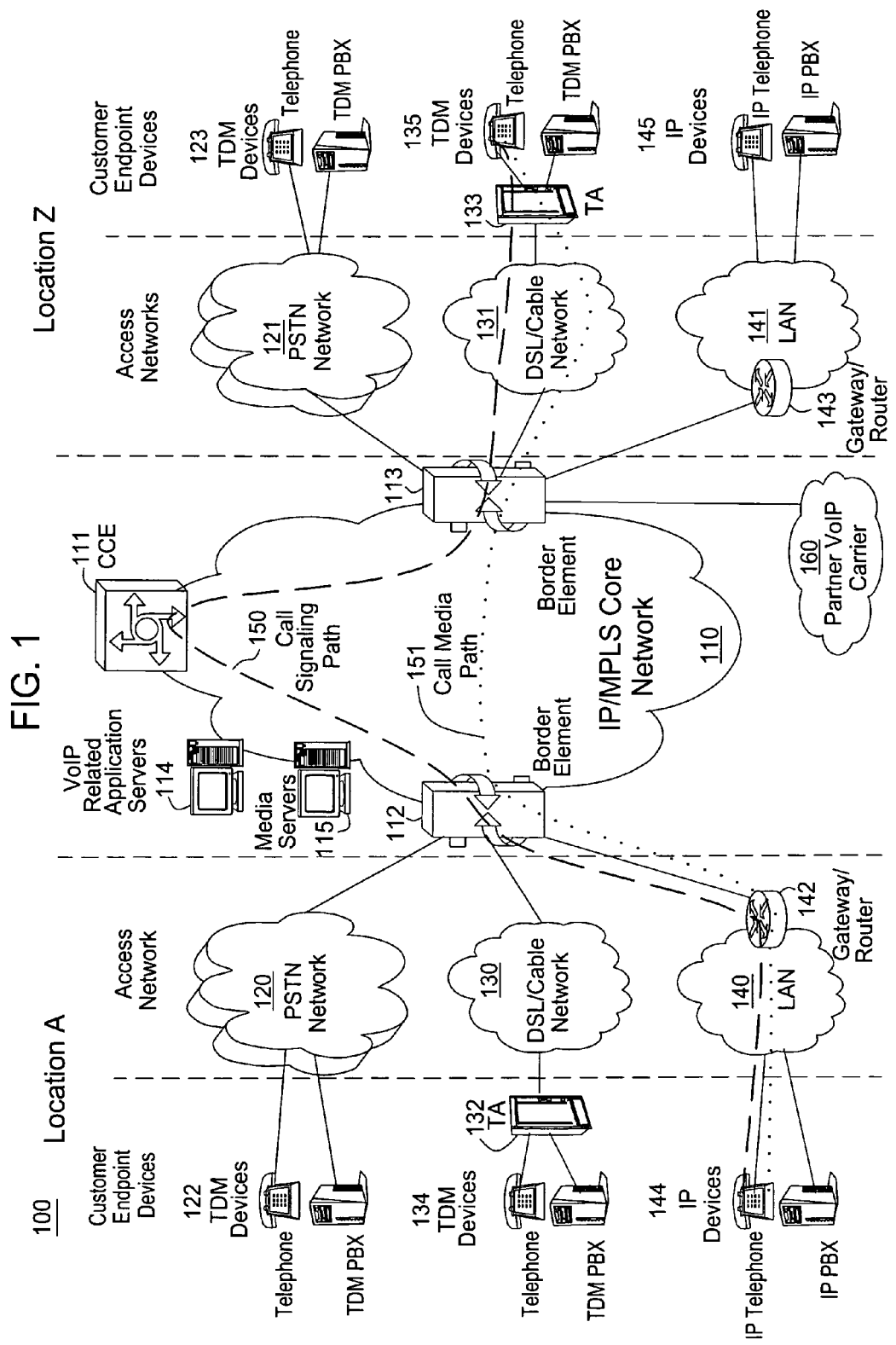
FIG. 1 is a block diagram depicting an exemplary embodiment of a communication system in accordance with the invention.

To better understand the present invention, FIG. 1 illustrates communication architecture 100 comprising an example network, e.g., a packet network such as a Voice over Internet Protocol (VoIP) network, related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such as the Border Elements (BEs) 112 and 113, the Call Control Element (CCE) 111, VoIP related Application Servers (AS) 114, Core elements (CEs), and Media Servers (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address and so on.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Figure 2:
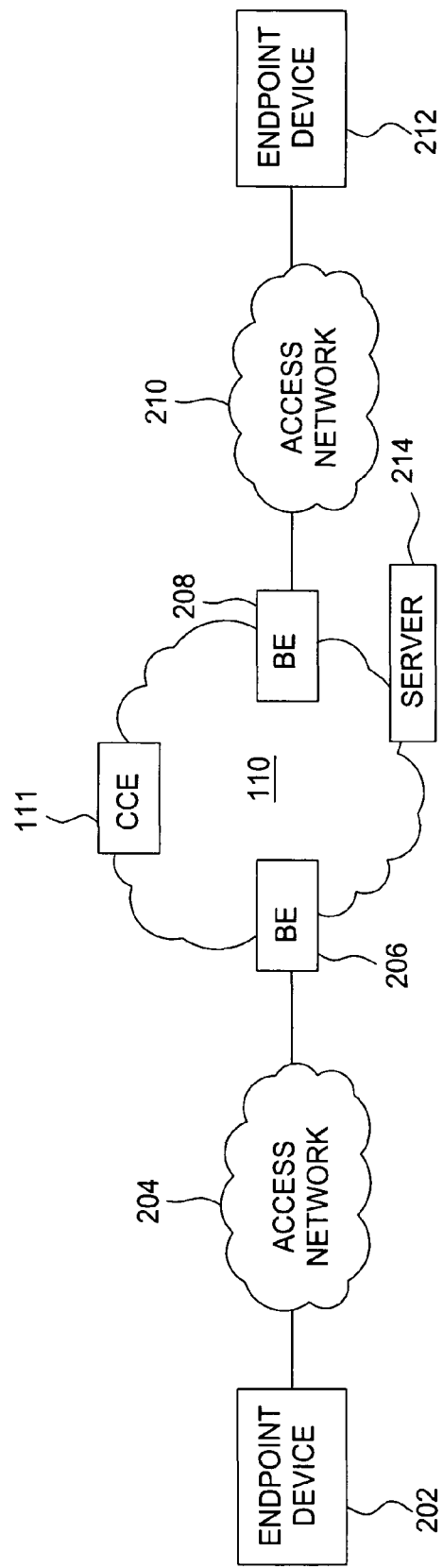
FIG. 2 is a block diagram depicting an exemplary configuration of the communication system of FIG. 1 constructed in accordance with one or more aspects of the invention.

FIG. 2 is a block diagram depicting an exemplary configuration of the communication system of FIG. 1 constructed in accordance with one or more aspects of the invention. An endpoint device 202 is configured for communication with the core network 110 via an access network 204 and at least one border element (BE) 206. An endpoint device 212 is configured for communication with the core network 110 via an access network 210 and at least one BE 208. The endpoint device 202 and the endpoint device 212 may comprise any of the customer endpoint devices described above (e.g., TDM devices, IP devices, etc.). The access networks 204 and 210 may comprise any of the access networks detailed above (e.g., PSTN, DSL/Cable, LAN, etc).

The core network 110 further includes a dedicated application server 214. In one embodiment of the present invention, the server 214 is configured to monitor the rate changes in the central processing unit (CPU) utilization and memory usage for each network component (e.g., border elements, core elements, call control elements, application servers, etc.) in the core network 110. Notably, each network component may include various hardware and software components under control of a CPU coupled to a memory. In the event either activity exceeds a certain predefined level in a given network element (e.g., BE 206), the server 214 sends at least one instruction message to the network element in order to resolve the excess rate change in the utilization of CPU and/or memory. Although only one server 214 is depicted in FIG. 1, those skilled in the art will appreciate that more than one server 214 may be utilized in accordance with the present invention.

In one embodiment, each network element may be configured with two predefined thresholds. One threshold corresponds to the rate change in the CPU utilization level (e.g., a predefined number of instructions/second over a given time period). The second threshold is associated with the rate change in memory space used by the network element (e.g., a predefined number of bytes per second over a given time period). Typically, these thresholds are set at levels that may be considered high or excessive by a network operator (e.g., 5 billion instructions per second over a predefined time period of 5 seconds). In the event either threshold level is exceeded (e.g., if the border element experiences a large incoming call volume that causes the CPU utilization rate change to exceed the predefined threshold level), the network element may be configured to transmit an alarm message to the application server 214.

For instance, if the CPU utilization is measured in instructions per second, the rate of change in CPU utilization is measured as the difference of the number of instructions/sec at time A and the number of instructions/sec at time B. In one embodiment, the present invention may be a threshold of "X" instructions/sec over a period of 5 seconds. For example, if a measurement of 15 billion instructions/sec is made at t=0 (where t represents time) and a subsequent measurement is made at 20 billion instructions/sec at t=5 seconds, then the resulting change in rate is equal to 5 billion instructions (i.e., 20 billion instructions/sec−15 billion instructions/sec) over the 5 second period. If this rate is greater than the predefined threshold of "X" instructions/sec over a period of 5 seconds, then the threshold is exceed and an alarm message is generated. Depending on the embodiment, the network element (e.g., BE 206) may send the alarm message to the server 214 or it may autonomously process the alert.

Similarly, the rate change of memory usage is calculated in a similar manner. If the memory usage is measured in bytes per second, the rate of change in memory usage is measured as the difference of the number of bytes/sec at time A and the number of bytes/sec at time B. In one embodiment, the present invention may be a threshold of "X" bytes/sec over a period of 5 seconds. For example, if a measurement of 15 billion bytes/sec is made at t=0 and a subsequent measurement is made at 20 billion bytes/sec at t=5 seconds, then the resulting change in rate is equal to 5 billion bytes (i.e., 20 billion bytes/sec–15 billion bytes/sec) over the 5 second period. If this rate is greater than the predefined threshold of "X" bytes/sec over a period of 5 seconds, then the threshold is exceed and an alarm message is generated. Depending on the embodiment, the network element (e.g., BE 206) may send the alarm message to the server 214 or it may autonomously process the alert.

Once received, the alarm message is processed by the server 214 and an instruction message is subsequently sent back to the network element. Notably, the instruction message may detail a specified action that can remedy the problem (that is detailed in the alarm message) at the network element. For example, if the CPU utilization rate change threshold has been exceeded, the server 214 may instruct the network element to block a number of incoming calls (e.g., call flows) in order to reduce the network element's CPU workload (or alternatively, memory usage) which in turn reduces the rate change to an acceptable level (i.e. below the threshold). Similarly, the network element may be instructed to reroute at least one call flow to another network element in an effort to reduce the rate change in the network's CPU usage (or memory usage).

In an alternative embodiment, the present invention completely resides in the network element. Specifically, the monitoring functions are executed by the network element as opposed to the application server 214. Notably, instructions to remedy problems existing at a network element are generated by the network element itself.

Figure 3:
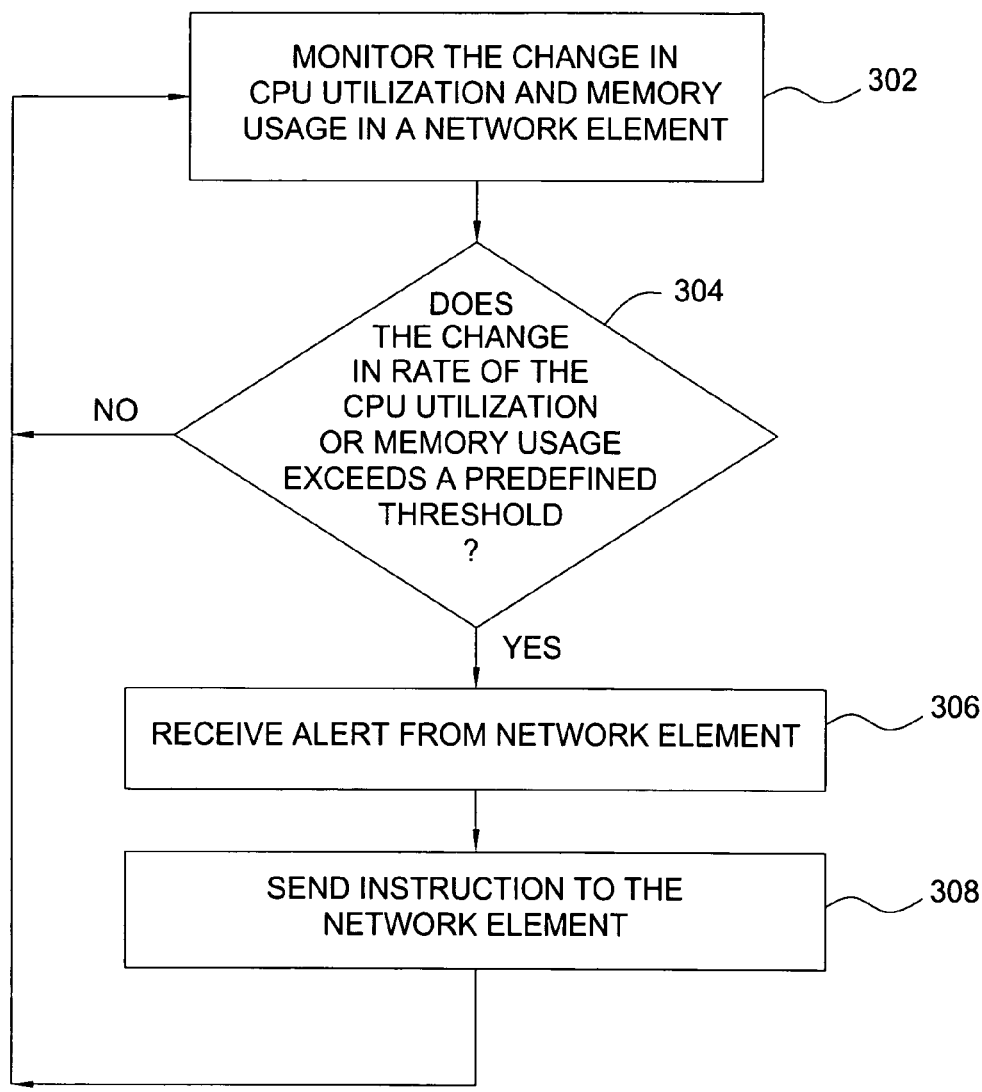
FIG. 3 is a flow diagram depicting an exemplary embodiment of a method for monitoring a network element in accordance with one or more aspects of the invention.

FIG. 3 is a flow diagram depicting an exemplary embodiment of a method 300 for monitoring a network element in a communications network as related to one or more aspects of the invention. The method 300 begins at step 302 where the rate changes in CPU utilization and memory usage in a network component is monitored. At step 304 where a determination is made as to whether the change in rate of the CPU utilization or memory usage exceed a predefined threshold. In one embodiment, each network element comprises two predefined thresholds (e.g., a CPU utilization and memory usage) rate changes. If at least one of the two thresholds is exceeded, the method 300 proceeds to step 306. If neither threshold is exceeded, the method returns to step 302.

At step 306, an alert is received from the network element. In one embodiment, a server 214 receives an alarm message from a network element when either the change in the rate of the CPU utilization or the memory usage (or both) of the network element exceeds a predefined threshold.

At step 308, an instruction is sent to the network element. In one embodiment, the server 214 responds by sending a message to the network element instructing it to reduce either the change in rate of the CPU utilization or the memory usage (or both). The instruction message may direct the network element to block or to reroute a number of calls received by the network element in an effort to reduce CPU utilization or memory usage rate change. The method 300 then returns to step 302.

Figure 4:
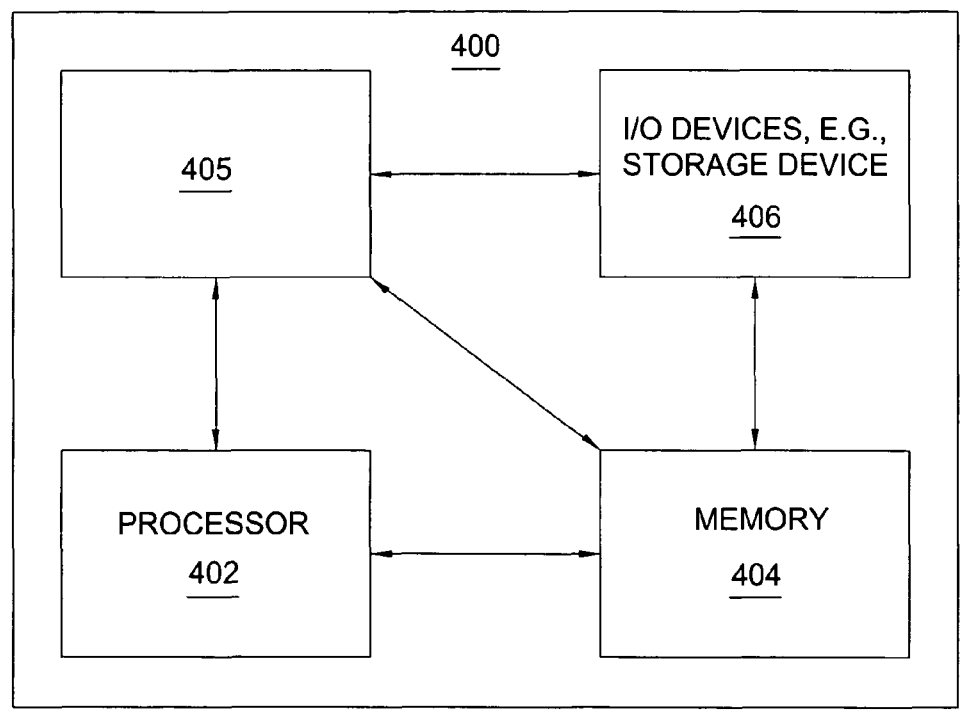
FIG. 4 is a block diagram depicting an exemplary embodiment of a computer suitable for implementing the processes and methods described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for monitoring a network element, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASICs), a general purpose computer or any other hardware equivalents. In one embodiment, the present module or process 405 for monitoring a network element can be loaded into memory 404 and executed by processor 402 to implement the functions as discussed above. As such, the present process 405 for monitoring a network element (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A method for monitoring a network element in a communications network, comprising:
   receiving an alarm message from the network element when a change in rate of a memory usage in a given time period by the network element exceeds a corresponding predefined threshold; and
   sending an instruction to the network element to reduce the change in rate of the memory usage, wherein the change in rate of the memory usage is reduced by rerouting a call flow to a second network element.

2. The method of claim 1, wherein the communications network comprises an internet protocol network.

3. The method of claim 2, wherein the internet protocol network comprises a voice over internet protocol network.

4. The method of claim 1, wherein the network element comprises a border element.

5. The method of claim 1, wherein the receiving comprises:
   generating the alarm message at the network element when the change in rate of the memory usage by the network element exceeds the predefined threshold.

6. The method of claim 1, wherein the network element comprises a core element.

7. The method of claim 1, wherein the network element comprises a call control element.

8. The method of claim 1, wherein the network element comprises an application server.

9. An apparatus for monitoring a network element in a communications network, comprising:
   a server configured to:
   receive an alarm message from the network element when a change in rate of a memory usage in a given time period by the network element exceeds a corresponding predefined threshold; and
   send an instruction to the network element to reduce the change in rate of the memory usage, wherein the change in rate of the memory usage is reduced by rerouting a call flow to a second network element.

10. The apparatus of claim 9, wherein the communications network comprises an internet protocol network.

11. The apparatus of claim 10, wherein the internet protocol network comprises a voice over internet protocol network.

12. The apparatus of claim 9, wherein the network element is configured to:
   generate the alarm message when the change in rate of the memory usage by the network element exceeds the predefined threshold.

13. A non-transitory computer readable storage medium having stored thereon a plurality of instructions, the plurality of instructions including instructions which, when executed by a processor, causes the processor to perform a method for monitoring a network element in a communications network, comprising:
   receiving an alarm message from the network element when a change in rate of a memory usage in a given time period by the network element exceeds a corresponding predefined threshold; and
   sending an instruction to the network element to reduce the change in rate of the memory usage, wherein the change in rate of the memory usage is reduced by rerouting a call flow to a second network element.

14. The non-transitory computer-readable storage of claim 13, wherein the communications network comprises an internet protocol network.

15. The non-transitory computer-readable storage of claim 14, wherein the internet protocol network comprises a voice over internet protocol network.

16. The non-transitory computer-readable storage of claim 13, wherein the network element comprises a border element.

17. The non-transitory computer-readable storage of claim 13, wherein the receiving comprises:
   generating the alarm message at the network element when the change in rate of the memory usage by the network element exceeds the predefined threshold.

18. The non-transitory computer-readable storage of claim 13, wherein the network element comprises a core element.

19. The non-transitory computer-readable storage of claim 13, wherein the network element comprises a call control element.

20. The non-transitory computer-readable storage of claim 13, wherein the network element comprises an application server.

* * * * *